US011998052B2

(12) United States Patent
Lee et al.

(10) Patent No.: US 11,998,052 B2
(45) Date of Patent: Jun. 4, 2024

(54) SHIELDING OF AN INDUCTION COIL WITHIN AN AEROSOL GENERATING DEVICE

(71) Applicant: KT&G CORPORATION, Daejeon (KR)

(72) Inventors: Jae Min Lee, Gyeonggi-do (KR); Sang Kyu Park, Gyeonggi-do (KR); Hwi Kyeong An, Seoul (KR); Seung Won Lee, Seoul (KR); Soung Ho Ju, Gyeonggi-do (KR)

(73) Assignee: KT&G CORPORATION, Daejeon (KR)

( * ) Notice: Subject to any disclaimer, the term of this patent is extended or adjusted under 35 U.S.C. 154(b) by 921 days.

(21) Appl. No.: 16/978,090

(22) PCT Filed: May 19, 2020

(86) PCT No.: PCT/KR2020/006533
§ 371 (c)(1),
(2) Date: Sep. 3, 2020

(87) PCT Pub. No.: WO2020/251179
PCT Pub. Date: Dec. 17, 2020

(65) Prior Publication Data

US 2023/0112360 A1 Apr. 13, 2023

(30) Foreign Application Priority Data

Jun. 11, 2019 (KR) ........................ 10-2019-0068812

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *H05B 6/105* (2013.01); *H05B 6/36* (2013.01)

(58) Field of Classification Search
CPC ......... A24F 40/465; H05B 6/105; H05B 6/36; H05B 6/365
See application file for complete search history.

(56) References Cited

U.S. PATENT DOCUMENTS 5,973,303 A 10/1999 Kuse
6,864,419 B2 3/2005 Lovens
(Continued)

FOREIGN PATENT DOCUMENTS

CA 3 026 992 A1 3/2018
CA 3 085 962 A1 7/2019
(Continued)

OTHER PUBLICATIONS

Communication dated Jan. 5, 2021, from the Korean Intellectual Property Office in application No. 10- 2019-0068812.
(Continued)

*Primary Examiner* — Vanessa Girardi
(74) *Attorney, Agent, or Firm* — Sughrue Mion, PLLC

(57) ABSTRACT

An aerosol generating device includes an accommodation space in a cylindrical shape for accommodating a cigarette, an induction coil wound along an outer surface of the accommodation space, a power supply for supplying electric power to the induction coil, a controller for controlling electric power supplied to the induction coil, and a shield film including a ferromagnetic material for shielding electromagnetic interference from electromagnetic waves emitted from the induction coil. The shield film surrounds only a portion of an outer surface of the induction coil to shield
(Continued)

the electromagnetic interference from the electromagnetic waves having a frequency that does not exceed 500 kHz.

9 Claims, 7 Drawing Sheets

(51) Int. Cl.
*H05B 6/10* (2006.01)
*H05B 6/36* (2006.01)

(56) References Cited

U.S. PATENT DOCUMENTS

| | | | | |
|---|---|---|---|---|
| 9,717,277 | B2 * | 8/2017 | Mironov | H05B 6/108 |
| 11,240,885 | B2 * | 2/2022 | Fursa | A24F 40/465 |
| 2017/0011840 | A1 | 1/2017 | Graham et al. | |
| 2017/0079326 | A1 | 3/2017 | Mironov | |
| 2019/0182909 | A1 | 6/2019 | Fursa et al. | |

FOREIGN PATENT DOCUMENTS

| | | | |
|---|---|---|---|
| CN | 202503867 | U | 10/2012 |
| CN | 203490951 | U | 3/2014 |
| CN | 105595437 | A | 5/2016 |
| CN | 205648334 | U | 10/2016 |
| CN | 108990403 | A | 12/2018 |
| CN | 109390087 | A | 2/2019 |
| JP | 5-56946 | A | 3/1993 |
| JP | 7263135 | A | 10/1995 |
| JP | 8-243096 | A | 9/1996 |
| JP | 11-307361 | A | 11/1999 |
| JP | 2000504874 | A | 4/2000 |
| JP | 2000-208249 | A | 7/2000 |
| JP | 2004241285 | A | 8/2004 |
| JP | 2007-242635 | A | 9/2007 |
| JP | 2017-200334 | A | 11/2017 |
| KR | 10-0610335 | B1 | 8/2006 |
| KR | 1020090055315 | A | 6/2009 |
| KR | 10-1116046 | B1 | 2/2012 |
| KR | 10-1648324 | B1 | 8/2016 |
| KR | 101663924 | B1 | 10/2016 |
| KR | 20-0482965 | Y1 | 4/2017 |
| KR | 1020190039713 | A | 4/2019 |
| TW | 201811205 | A | 4/2018 |
| WO | 2015/177264 | A1 | 11/2015 |
| WO | 2018/041450 | A1 | 3/2018 |
| WO | 2019/048380 | A1 | 3/2019 |
| WO | 2019/129639 | A1 | 7/2019 |

OTHER PUBLICATIONS

International Search Report dated Jan. 19, 2021, in International Application No. PCT/KR2020/006533.

Communication dated Mar. 30, 2021, issued by the Taiwanese Patent Office in application No. 109119748.

Office Action dated Nov. 19, 2021 in Canadian Application No. 3,095,322.

Extended European Search Report dated Jan. 5, 2022 in European Application No. 20767704.8.

Office Action dated Nov. 9, 2021 in Japanese Application No. 2020-551546.

Office Action dated Dec. 27, 2021 in Taiwanese Application No. 109119748.

Office Action dated May 13, 2022 from the Russian Federal Service for Intellectual Property in RU Application No. 2020134714/03.

Office Action dated Apr. 6, 2023 in Chinese Application No. 202080001770.1.

Office Action dated Sep. 14, 2023 in Chinese Application No. 202080001770.1.

* cited by examiner

SHIELDING OF AN INDUCTION COIL WITHIN AN AEROSOL GENERATING DEVICE

CROSS REFERENCE TO RELATED APPLICATIONS

This application is a National Stage of International Application No. PCT/KR2020/006533 filed May 19, 2020, claiming priority based on Korean Patent Application No. 10-2019-0068812 filed Jun. 11, 2019.

TECHNICAL FIELD

One or more embodiments of the present disclosure relate to an aerosol generating device. More specifically, one or more embodiments of the present disclosure relate to an aerosol generating device including an induction coil for generating an aerosol through induction heating, and a shield film for blocking electromagnetic waves emitted from the induction coil.

BACKGROUND ART

Recently, the demand for alternative methods of overcoming the shortcomings of general cigarettes has increased. For example, there is growing demand for a method of generating aerosol by heating a tobacco rod in a cigarette, rather than by combusting cigarettes. Research has been conducted on induction heating in that a cigarette is heated using a magnetic material that generates heat resulting from a magnetic field applied from the outside.

In the case of an induction heating-type aerosol generating device, electromagnetic waves may be emitted from an induction coil that receives an alternating current to form an alternating magnetic field. There might be a problem in that the electromagnetic waves emitted from the induction coil may create electromagnetic interference (EMI) in other electronic components of the aerosol generating device, and may negatively affect a user's body.

Therefore, there is need for a technology that effectively blocks the electromagnetic waves emitted from the induction coil while the aerosol generating device generates an aerosol through induction heating.

DESCRIPTION OF EMBODIMENTS

Technical Problem

One or more embodiments of the present disclosure provide an aerosol generating device. Additional aspects will be set forth in part in the description which follows and, in part, will be apparent from the description, or may be learned by the practice of the presented embodiments.

According to an aspect of the present disclosure, an aerosol generating device includes: an accommodation space in a cylindrical shape for accommodating a cigarette; an induction coil wound along an outer surface of the accommodation space; a power supply for supplying electric power to the induction coil; a controller for controlling electric power supplied to the induction coil; and a shield film including a ferromagnetic material for blocking electromagnetic interference from electromagnetic waves emitted from the induction coil, wherein the shield film may surround only a portion of an outer surface of the induction coil to block the electromagnetic interference from the electromagnetic waves having a frequency that does not exceed 500 kHz.

Advantageous Effects of Disclosure

A shield film included within an aerosol generating device according to one or more embodiments of the present disclosure may be configured to effectively block electromagnetic waves having a frequency that does not exceed 500 kHz by surrounding only a portion of an outer surface in a cylindrical shape wound by an induction coil without completely surrounding the outer surface of the induction coil. Accordingly, other components (e.g., conductors or the like) may be arranged at a portion of the outer surface of the induction coil that is not surrounded by the shield film, thus simplifying a manufacturing process and structural freedom for the aerosol generating device. In addition, even when the shield film surrounds only a portion of the outer surface of the induction coil, electromagnetic interference and harmful effects on a user's body from electromagnetic waves of the induction coil may be adequately prevented. Therefore, the induction heating-type aerosol generating device may operate in a more stable manner.

BEST MODE

Figure 1:
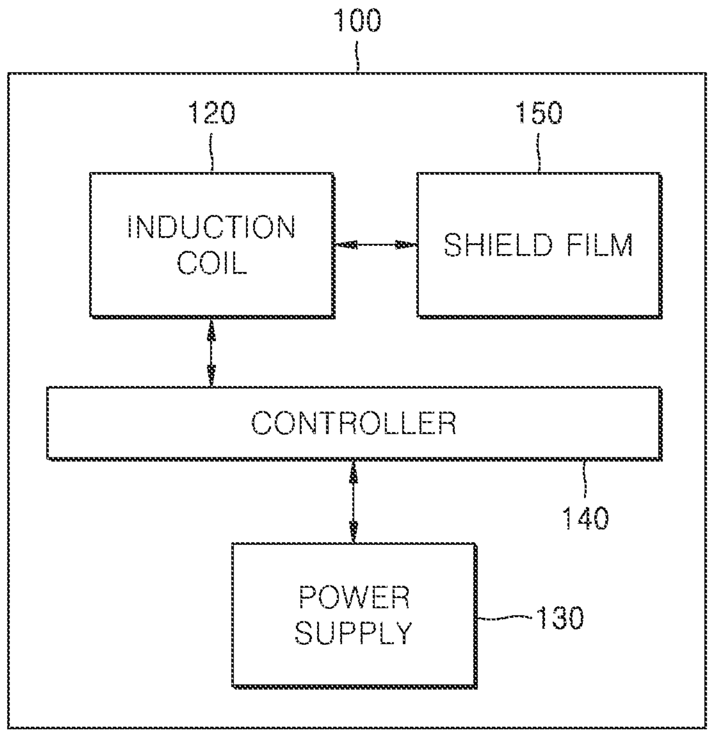
FIGS. 1 and 2 are diagrams illustrating components constituting an aerosol generating device, according to an embodiment of the present disclosure.

According to an aspect of the present disclosure, an aerosol generating device includes: an accommodation space in a cylindrical shape for accommodating a cigarette; an induction coil wound along an outer surface of the accommodation space; a power supply for supplying electric power to the induction coil; a controller for controlling electric power supplied to the induction coil; and a shield film including a ferromagnetic material for blocking electromagnetic interference from electromagnetic waves emitted from the induction coil, wherein the shield film may surround only a portion of an outer surface of the induction coil to block the electromagnetic interference from the electromagnetic waves having a frequency that does not exceed 500 kHz.

In addition, the shield film may include a plurality of film segments, wherein the plurality of film segments may surround only a portion of the outer surface of the induction coil by partially surrounding the outer surface of the induction coil along a circumferential direction of the outer surface of the induction coil.

Moreover, the shield film in a mesh structure that surrounds the portion of the outer surface of the induction coil.

Furthermore, the shield film may surround 50% or more and 95% or less of the outer surface of the induction coil.

The aerosol generating device may further include an additional film including a nonferrous metal for additionally blocking the electromagnetic interference from the electromagnetic waves emitted from the induction coil, wherein the additional film may surround at least a portion of an outer surface of the shield film.

The shield film may further include a nonferrous metal for additionally blocking the electromagnetic interference from the electromagnetic waves emitted from the induction coil.

In addition, the shield film may be spaced apart from the induction coil by 0.5 mm or more and 3 mm or less.

Moreover, the shield film may have a thickness of 0.2 mm or more and 2 mm or less.

The controller may control a frequency of an alternating current supplied to the induction coil not to exceed 500 kHz.

MODE OF DISCLOSURE

Hereinafter, embodiments of the present disclosure will be described in detail with reference to the accompanying drawings. It is to be appreciated that the following descriptions are intended merely to better illuminate the embodiments and do not pose a limitation on the scope of one or more embodiments of the present disclosure. What is apparent to those skilled in the art from the detailed descriptions and embodiments will be construed as being included in the scope of protection defined by the claims.

As used herein, terms such as

"consisting of" or "comprising" should not be construed as including all of various components or steps described in the specification, but rather should be construed as not including some of the components or some of the steps, or should be construed as further including additional components or steps.

As used herein, terms including an ordinal number such as "first" or "second" may be used to describe various components, but the components should not be limited by the terms. The terms are used only for the purpose of distinguishing one component from other components.

With respect to the terms used to describe the various embodiments, general terms which are currently and widely used are selected in consideration of functions of structural elements in the various embodiments of the present disclosure. However, meanings of the terms can be changed according to intention, a judicial precedence, the appearance of new technology, and the like. In addition, in certain cases, a term which is not commonly used may be selected. In such a case, the meaning of the term will be described in detail at the corresponding portion in the description of the present disclosure. Therefore, the terms used in the various embodiments of the present disclosure should be defined based on the meanings of the terms and the descriptions provided herein.

One or more embodiments of the present disclosure relate to an aerosol generating device, and detailed descriptions of matters well known to those skilled in the art to which the following embodiments pertain will be omitted.

Figure 2:
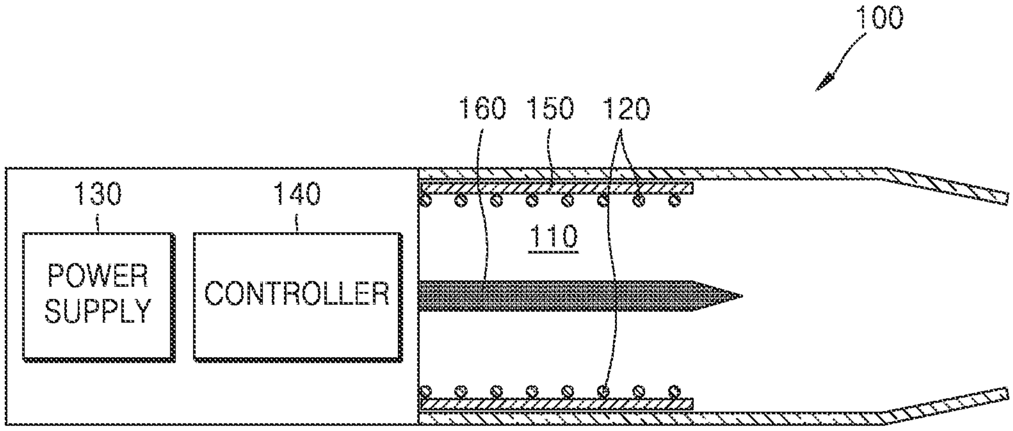

FIGS. 1 and 2 are diagrams illustrating components constituting an aerosol generating device, according to an embodiment of the present disclosure.

Referring to FIG. 1, an aerosol generating device 100 may include an induction coil 120, a power supply 130, a controller 140, and a shield film 150. However, embodiments of the present disclosure are not limited thereto, and the aerosol generating device 100 may further include other general-purpose components apart from the components illustrated in FIG. 1. For example, the aerosol generating device 100 may further include an accommodation space 110 and a heater 160 as illustrated in FIG. 2.

The aerosol generating device 100 may heat a cigarette accommodated in the aerosol generating device 100 through induction heating to generate an aerosol. Induction heating may refer to a method of heating a magnetic material by applying an alternating magnetic field that periodically changes a direction to the magnetic material such that the magnetic material generates heat in response to the external magnetic field.

When the alternating magnetic field is applied to the magnetic material, energy loss may occur in the magnetic material due to eddy current loss and hysteresis loss, and the lost energy may be released from the magnetic material as thermal energy. As the amplitude or frequency of the alternating magnetic field applied to the magnetic material increases, the thermal energy released from the magnetic material may increase. The aerosol generating device 100 may apply the alternating magnetic field such that the magnetic material may release the thermal energy and transfer the thermal energy to the cigarette The magnetic material that generates heat resulting from the external magnetic field may include a susceptor. The susceptor may heat an aerosol generating material included in the cigarette in various ways. The susceptor may be provided in the aerosol generating device 100 semi-permanently so that the susceptor is able to be used repeatedly. For example, at least a portion of the heater 160 may be formed as the susceptor. However, embodiments of the present disclosure are not limited thereto, and the susceptor may be included inside the cigarette in the form of pieces, flakes, strips, or the like, instead of being provided in the aerosol generating device 100.

At least a portion of the susceptor may include a ferromagnetic material. For example, the susceptor may include a metal or carbon. The susceptor may include at least one of ferrite, a ferromagnetic alloy, stainless steel, and aluminum (Al). Alternatively, the susceptor may include at least one of ceramic such as graphite, molybdenum, silicon carbide, niobium, a nickel alloy, a metal film, zirconia, or the like, a transition metal such as nickel (Ni), cobalt (Co), or the like, and a metalloid such as boron (B) or phosphorus (P).

The accommodation space 110 may have a cylindrical shape to accommodate the cigarette. The aerosol generating device 100 may accommodate the cigarette through the accommodation space 110. As illustrated in FIG. 2, the heater 160 may be arranged in the accommodation space 110. Still, the susceptor may be included in the cigarette, instead of the heater 160 being directly provided in the aerosol generating device 100 as described above. It has been described that since, in general, the cigarette is in a cylindrical shape, the accommodation space 110 may also be in a cylindrical shape. However, embodiments of the present disclosure are not limited thereto. The accommodation space 110 may have a shape corresponding to a cross section of the cigarette, or may be in a shape different from the cross section of the cigarette.

When the heater 160 is provided in the aerosol generating device 100, the heater 160 may include an internal heater having an elongated shape to be inserted into the cigarette, as illustrated in FIG. 2. However, embodiments of the present disclosure are not limited thereto. The heater 160 may be implemented with an external heater surrounding the cigarette to heat the cigarette from the outside, and may be implemented with a combination of an internal heater and an external heater.

The heater 160 may heat the cigarette accommodated in the aerosol generating device 100. The heater 160 may heat the cigarette through induction heating. The heater 160 may include the susceptor that generates heat resulting from the external magnetic field, and the aerosol generating device 100 may apply a magnetic field to the heater 160 to heat the cigarette.

The induction coil 120 may be wound along an outer surface of the accommodation space 110. Since the accommodation space 110 may be in a cylindrical shape and the induction coil 120 may be wound along the outer surface of the accommodation space 110, the induction coil 120 may also be wound in a cylindrical shape.

The induction coil 120 may apply a magnetic field to the accommodation space 110. When electric power is supplied to the induction coil 120 from the aerosol generating device 100, the magnetic field may be generated in the accommodation space 110 inside the induction coil 120. When an alternating current is applied to the induction coil 120, an alternating magnetic field that periodically changes direction may be generated inside the induction coil 120. When the cigarette is accommodated in the accommodation space 110, and an alternating magnetic field is applied to the susceptor included in the heater 160 or the cigarette. Accordingly, the susceptor may generate heat to heat the aerosol generating material included in the cigarette.

The induction coil 120 may have a suitable length in a longitudinal direction of the aerosol generating device 100, and the induction coil 120 may be arranged at a position suitable for applying an alternating magnetic field to the susceptor included in the heater 160 or the cigarette. For example, the induction coil 120 may have a length corresponding to a length of the heater 160, and the induction coil 120 may be arranged at a position corresponding to the heater 160. As the induction coil 120 has a size and position corresponding to the susceptor included in the heater 160 or the cigarette, the alternating magnetic field of the induction coil 120 may be efficiently applied to the susceptor.

When the amplitude or frequency of the alternating magnetic field generated by the induction coil 120 is changed, a degree to which the susceptor included in the heater 160 or the cigarette heats the cigarette may be changed. Since the amplitude or frequency of the alternating magnetic field generated by the induction coil 120 may be changed by electric power applied to the induction coil 120, the aerosol generating device 100 may regulate the electric power applied to the induction coil 120 to control heating of the cigarette. For example, the aerosol generating device 100 may control the amplitude and frequency of an alternating current applied to the induction coil 120.

As an example, the induction coil 120 may be implemented as a solenoid. The induction coil 120 may include a solenoid that is wound along the outer surface of the accommodation space 110, and the susceptor included in the heater 160 or the cigarette, and the cigarette may be located in an inner space of the solenoid. The solenoid may include a conducting material such as copper (Cu). However, embodiments of the present disclosure are not limited thereto. The conducting material constituting the solenoid may include any one of silver (Ag), gold (Au), Al, tungsten (W), zinc (Zn), or nickel (Ni) or an alloy including at least one thereof.

The power supply 130 may supply electric power to the induction coil 120. The power supply 130 may supply electric power to the aerosol generating device 100. The power supply 130 may include a battery for supplying a direct current to the aerosol generating device 100, and a converter for converting the direct current supplied by the battery into an alternating current supplied to the induction coil 120.

The battery may supply the direct current to the aerosol generating device 100. The battery may include a lithium iron phosphate ($LiFePO_4$) battery. However, embodiments of the present disclosure are not limited thereto. For example, the battery may include a lithium cobalt oxide ($LiCoO_2$) battery, a lithium titanate battery, or the like.

The converter may include a low-pass filter that filters the direct current supplied by the battery to output the alternating current supplied to the induction coil 120. The converter may further include an amplifier for amplifying the direct current supplied by the battery. For example, the converter may be implemented through the low-pass filter constituting a load network of a class-D amplifier.

The controller 140 may control electric power supplied to the induction coil 120. The controller 140 may control the power supply 130 to regulate the electric power supplied to the induction coil 120. For example, the controller 140 may control a temperature at which the cigarette is heated to be maintained constant based on a temperature of the susceptor included in the heater 160 or the cigarette.

The controller 140 can be implemented as an array of a plurality of logic gates or can be implemented as a combination of a general-purpose microprocessor and a memory in which a program executable in the microprocessor is stored. In addition, the controller 140 may include a plurality of processing elements.

The controller 140 may control a frequency of the alternating current supplied to the induction coil 120 not to exceed 500 kHz. When the frequency of the alternating current does not exceed 500 kHz, the frequency of electromagnetic waves emitted from the induction coil 120 may not exceed 500 kHz, either. Thus, the aerosol generating device 100 may operate at a relatively low frequency compared to a general induction heating frequency of several MHz. Also, the electromagnetic waves emitted from the induction coil 120 may also have a relatively low frequency.

The shield film 150 may include a ferromagnetic material for blocking electromagnetic interference from the electromagnetic waves emitted from the induction coil 120. Since the alternating current may be supplied to the induction coil 120 by the power supply 130, the electromagnetic waves may be emitted from the induction coil 120. The electromagnetic interference (EMI) may be generated in other electronic components provided within the aerosol generating device 100, by the electromagnetic waves emitted from the induction coil 120. In order to block the EMI from the induction coil 120, the aerosol generating device 100 may be provided with the shield film 150.

The ferromagnetic material included in the shield film 150 may include ferrite. Ferrite may refer to an iron oxide-based magnetic material including a magnetic ceramic. By including ferrite, the shield film 150 may have high electrical conductivity and high magnetic permeability. Still, the ferromagnetic material included in the shield film 150 may be another material having ferromagnetic properties such as a metal alloy and the like, apart from ferrite.

Shielding of the EMI may refer to electromagnetic shielding that prevents electromagnetic waves generated in a specific space from leaking out. The electromagnetic waves emitted from the induction coil 120 may be blocked through electromagnetic shielding by the shield film 150.

The shield film 150 may include a ferromagnetic material. Since the ferromagnetic material may include a conductor having high electrical conductivity, when the induction coil 120 is surrounded by the ferromagnetic material, an electric field by the induction coil 120 may be blocked. Also, since the ferromagnetic material may have high magnetic permeability, when the induction coil 120 is surrounded by the ferromagnetic material, the magnetic field by the induction coil 120 may be blocked.

The shield film 150 may surround only a portion of the outer surface of the induction coil 120 to block the EMI caused from the electromagnetic waves having the frequency that does not exceed 500 kHz. As such, the remaining portions of the outer surface of the induction coil 120 may be exposed to the outside.

As described above, the induction heating of the aerosol generating device 100 may be performed at a frequency that does not exceed 500 kHz, and the frequency of the electromagnetic waves emitted from the induction coil 120 may not exceed 500 kHz, either. As such, since the frequency of the electromagnetic waves is low, a wavelength of the electromagnetic waves is long. In this case, it may be easy to block the EMI from the electromagnetic waves having a long wavelength. Therefore, even when the shield film 150 surrounds only a portion of the outer surface of the induction coil 120, instead of surrounding the entire outer surface of the induction coil 120, electromagnetic shielding may be achieved by the shield film 150.

When the shield film 150 surrounds only a portion of the outer surface of the induction coil 120, there may be advantages in that manufacturing process of the shield film 150 may become simplified and the shape of the shield film 150 may be maintained even when the aerosol generating device 100 is repeatedly used. For example, if the film segments constituting the shield film 150 are arranged spaced apart from each other and surround a portion of the outer surface of the induction coil 120, the shield film 150 may be manufactured more easily compared to when the shield film 150 surrounds the entire outer surface of the induction coil 120. Also, deformation of the shield film 150, which is caused by frequent temperature changes due to a repeated use of the aerosol generating device 100, may be significantly reduced.

Figure 3:
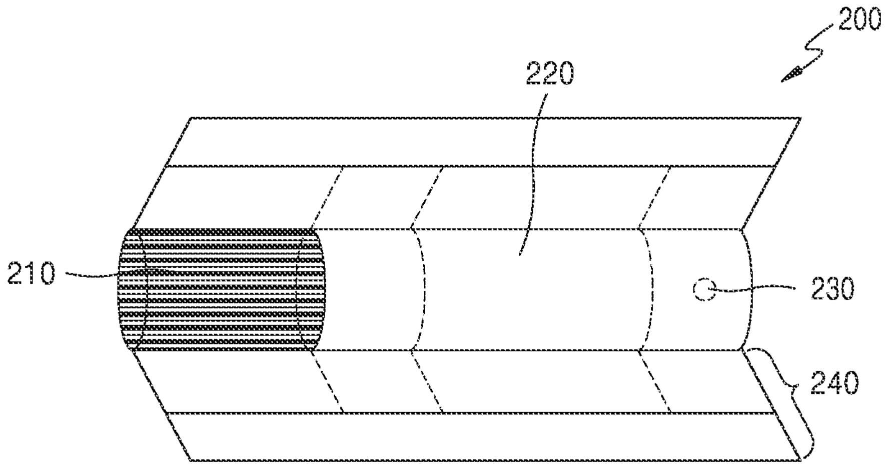
FIG. 3 is a diagram illustrating a cigarette that generates an aerosol through an aerosol generating device, according to an embodiment of the present disclosure.

FIG. 3 is a diagram illustrating a cigarette that generates an aerosol through an aerosol generating device, according to an embodiment of the present disclosure. Referring to FIG. 3, a cigarette 200 may include a tobacco rod 210 and a filter rod 220. The filter rod 220 may include a plurality of segments. For example, the filter rod 220 may include a segment configured to cool an aerosol and a segment configured to filter a certain component included in the aerosol. Also, the filter rod 220 may further include at least one segment configured to perform other functions.

The cigarette 200 may be packaged by at least one wrapper 240. The wrapper 240 may have at least one hole through which external air may be introduced or internal air may be discharged. For example, the cigarette 200 may be packaged by one wrapper 240. As another example, the cigarette 200 may be double-packaged by at least two wrappers 240. In detail, the tobacco rod 210 may be packaged by a first wrapper, and the filter rod 220 may be packaged by a second wrapper. Also, the tobacco rod 210 and the filter rod 220, which are individually packaged by separate wrappers, may be coupled to each other, and the entire cigarette 200 may be re-packaged by a third wrapper.

The tobacco rod 210 may include an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. The tobacco rod 210 may include other additives, such as flavors, a wetting agent, and/or organic acid. The tobacco rod 210 may include a flavored liquid, such as menthol or a moisturizer, which is injected to the tobacco rod 210.

The tobacco rod 210 may be manufactured in various forms. For example, the tobacco rod 210 may be formed using a sheet or strands. Also, the tobacco rod 210 may be formed of tiny bits cut from a tobacco sheet.

The tobacco rod 210 may be surrounded by a heat conductive material. For example, the heat conductive material may be, but is not limited to, a metal foil such as aluminum foil. The heat conductive material surrounding the tobacco rod 210 may uniformly distribute heat transmitted to the tobacco rod 210, and thus, the heat conductivity of the tobacco rod may be increased and taste of the tobacco may be improved.

As described above with reference to FIGS. 1 and 2, the cigarette 200 may include a susceptor that heats an aerosol generating material through induction heating. For example, the thermally conductive material surrounding the tobacco rod 210 may function as the susceptor that is heated by an alternating magnetic field applied by the induction coil 120. However, embodiments of the present disclosure are not limited thereto. Apart from the thermally conductive material surrounding the tobacco rod 210, the tobacco rod 210 may include a susceptor in various forms such as pieces, flakes, strips, or the like that generates heat resulting from the magnetic field.

The filter rod 220 may include a cellulose acetate filter. Shapes of the filter rod 220 are not limited. For example, the filter rod 220 may include a cylinder-type rod or a tube-type rod having a hollow inside. Alternatively, the filter rod 220 may be in a recessed rod shape including a cavity therein. When the filter rod 220 includes a plurality of segments, the plurality of segments may have a different shape.

The filter rod 220 may be formed to generate flavors. For example, a flavoring liquid may be injected onto the filter rod 220, or an additional fiber coated with a flavoring liquid may be inserted into the filter rod 220.

Also, the filter rod 220 may include at least one capsule 230. The capsule 230 may generate a flavor or an aerosol. For example, the capsule 230 may have a configuration in which a liquid containing a flavoring material is wrapped with a film. For example, the capsule 230 may have a spherical or cylindrical shape, but is not limited thereto.

When the filter rod 220 includes a segment configured to cool the aerosol, the cooling segment may include a polymer material or a biodegradable polymer material. For example, the cooling segment may include pure polylactic acid alone, but the material for forming the cooling segment is not limited thereto. In some embodiments, the cooling segment may include a cellulose acetate filter having a plurality of holes. However, the cooling segment is not limited as long as the cooling segment cools the aerosol.

The cigarette 200 described with reference to FIG. 3 is merely one example, and an aerosol generating article accommodated in the aerosol generating device 100 may not be limited to the cigarette 200 of FIG. 3. Accordingly, the aerosol generating article may have various structures or ingredients different from the cigarette 200.

Figure 4:
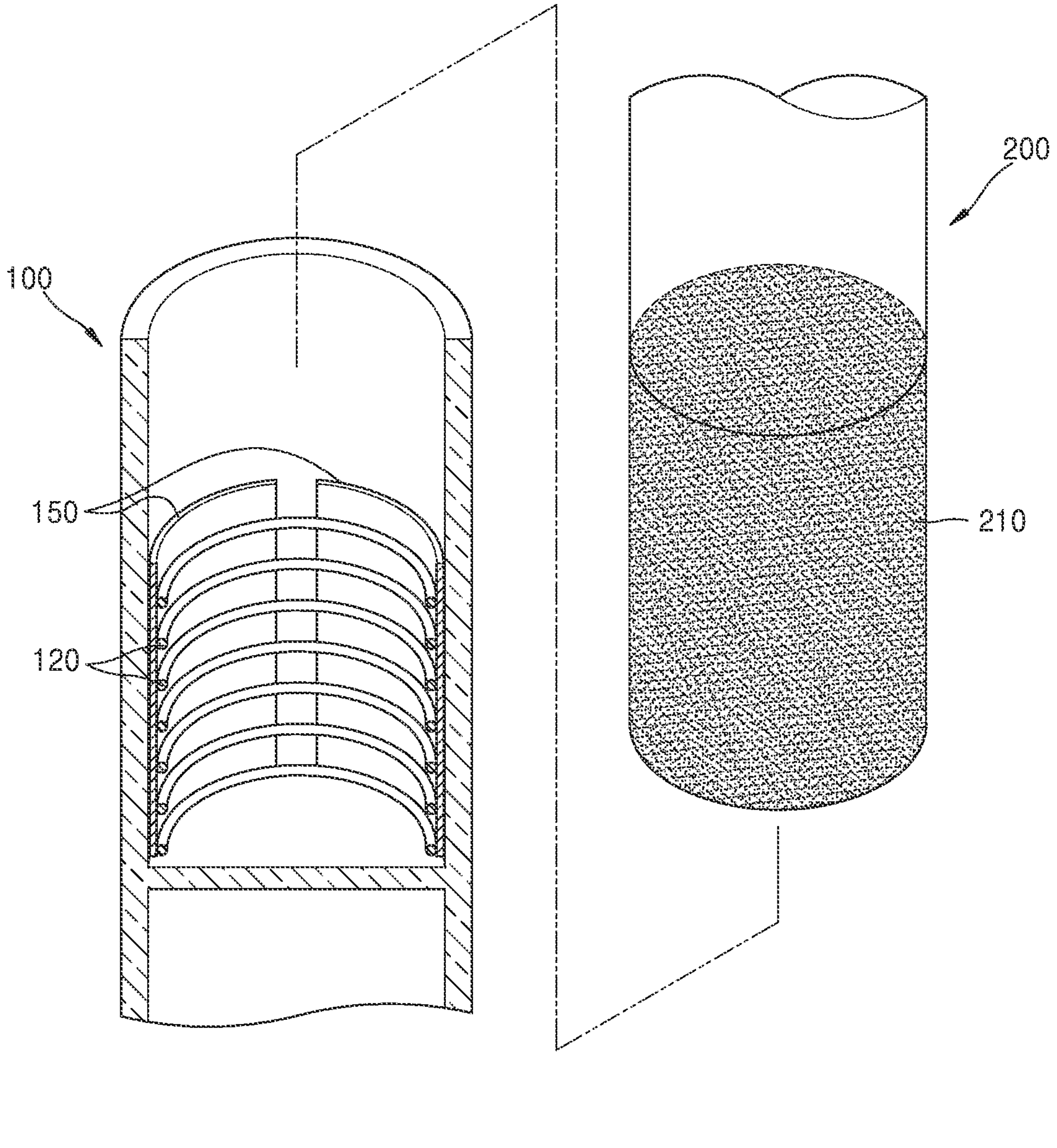
FIG. 4 is a diagram illustrating a positional relationship between an induction coil, a shield film, and a cigarette, according to an embodiment of the present disclosure.

FIG. 4 is a diagram illustrating a positional relationship between an induction coil, a shield film, and a cigarette, according to an embodiment of the present disclosure.

FIG. 4 illustrates an example in which the cigarette 200 is accommodated in the aerosol generating device 100 including the induction coil 120 and the shield film 150. However, the positional relationship between the aerosol generating device 100, the induction coil 120, the shield film 150, and the cigarette 200 illustrated in FIG. 4 is merely one example, and a different positional relationship in which a magnetic field is applied to the cigarette 200 accommodated in the aerosol generating device 100 by the induction coil 120 may also be possible. The heater 160 including a susceptor may be provided within the aerosol generating device 100 and generate heat resulting from a magnetic field of the induction coil 120 to heat the tobacco rod 210.

When the cigarette 200 is accommodated in the accommodation space 110, the tobacco rod 210 may be surrounded by the induction coil 120, and the susceptor included in the heater 160 or the tobacco rod 210 may be heated by the magnetic field of the induction coil 120. The position and size of the induction coil 120 may be designed to optimize the efficiency of induction heating. For example, the induction coil 120 may be arranged at a position corresponding to the tobacco rod 210, and may have a length corresponding to the tobacco rod 210 or the heater 160.

The induction coil 120 may be wound along an outer surface of the accommodation space 110 and have a cylindrical shape. The cigarette 200 may be accommodated in the accommodation space 110 through an opening above the induction coil 120, and the shield film 150 may be arranged to surround the outer surface of the induction coil 120. Since the shield film 150 surrounds only a portion of the outer surface of the induction coil 120, the remaining portions of the outer surface of the induction coil 120 may be exposed out of the induction coil 120.

The shield film 150 may be spaced apart from the induction coil 120. The shield film 150 and the induction coil 120 may be spaced apart from each other to the extent that does not affect the overall size of the aerosol generating device 100. An air layer may be formed between the shield film 150 and the induction coil 120 due to such spacing, and excessive heat may be prevented from being transferred to a user from the cigarette 200 heated through induction heating, thanks to thermal insulation of the air layer. Apart from the air layer, a thermal insulation material may be filled in a space between the shield film 150 and the induction coil 120.

As an example, the shield film 150 may be spaced apart from the induction coil 120 by 0.1 mm or more and 5 mm or less. Alternatively, the shield film 150 may be spaced apart from the induction coil 120 by 0.5 mm or more and 3 mm or less. The shield film 150 may also be spaced apart from the induction coil 120 by 1 mm or more and 2 mm or less. The air layer or the like may be formed between the shield film 150 and the induction coil 120 to prevent the excessive heat from being transferred to the user while the overall size of the aerosol generating device 100 is not significantly increased thanks to the above-described spacing.

A thickness of the shield film 150 may differ according to embodiments. Depending on the thickness of the shield film 150, a degree to which EMI from electromagnetic waves emitted from the induction coil 120 is blocked may differ. The thickness of the shield film 150 may be set within a suitable range capable of blocking the EMI to the extent that does not affect the overall size of the aerosol generating device 100. On the other hand, the thickness of the shield film 150 may also be changed according to a proportion of the outer surface of the induction coil 120 surrounded by the shield film 150.

As an example, the thickness of the shield film 150 may be set according to a proportion of the outer surface of the induction coil 120 surrounded by the shield film 150. As another example, the thickness of the shield film 150 may also be set according to a degree of saturation of the shield film 150 with respect to an amount of electric power induced by the induction coil 120. For example, the shield film 150 may have a thickness of 0.03 mm or more and 3 mm or less. Alternatively, the shield film 150 may have a thickness of 0.06 mm or more and 2 mm or less. The shield film 150 may also have a thickness of 0.1 mm or more and 0.5 mm or less. The EMI may be adequately blocked without significantly increasing the size of the aerosol generating device 100 thanks to such thickness values.

Figure 5:
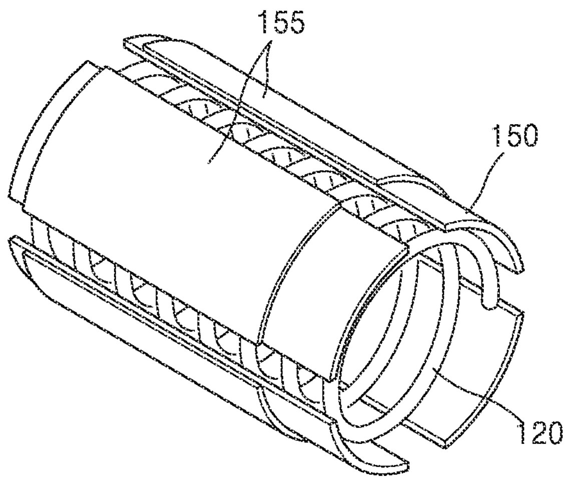
FIGS. 5 and 6 are diagrams illustrating a shield film that surrounds at least a portion of an outer surface of an induction coil, according to an embodiment of the present disclosure.
Figure 6:
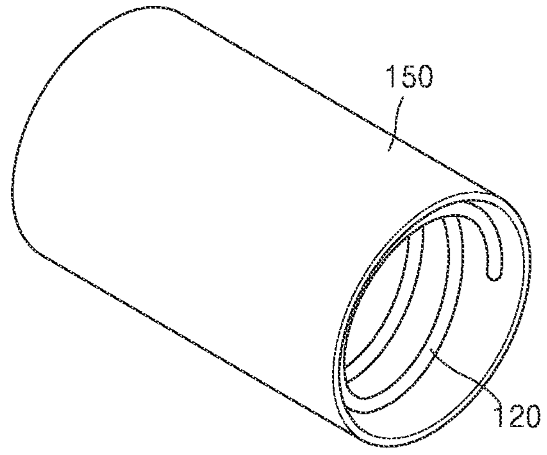

FIGS. 5 and 6 are diagrams illustrating a shield film that surrounds at least a portion of an outer surface of an induction coil, according to an embodiment of the present disclosure.

FIGS. 5 and 6 illustrate examples in which only a portion of the outer surface of the induction coil 120 is surrounded by the shield film 150. However, embodiments of the present disclosure are not limited thereto. The shield film 150 may surround only a portion of the outer surface of the induction coil 120 in different ways.

The shield film 150 may include a plurality of film segments. It has been illustrated that the shield film 150 includes four film segments in FIG. 5. However, embodiments of the present disclosure are not limited thereto. The shield film 150 may include a different number of film segments.

The plurality of film segments may surround only a portion of the outer surface of the induction coil 120 along a circumferential direction of the outer surface of the induction coil 120. Referring to FIG. 5, four film segments are spaced apart from each other along the circumferential direction of the cylindrical-shaped induction coil 120. As such, the shield film 150 may surround only a portion of the induction coil 120 in the circumferential direction.

FIG. 5 illustrates that the plurality of film segments are arranged along the circumferential direction of the induction coil 120. However, embodiments of the present disclosure are not limited thereto. For example, the plurality of film segments may be spaced apart in a height direction or lengthwise direction of the cylindrical-shaped induction coil 120. Depending on an arrangement of the induction coil 120 and other components connected to the induction coil 120, shapes or positions of the plurality of film segments constituting the shield film 150 may be set in various ways.

Referring to FIG. 6, the shield film 150 of a mesh structure may surround only a portion of the outer surface of the induction coil 120. When the shield film 150 is in a mesh structure, unlike the case of FIG. 5, the shield film 150 may include a single film rather than the plurality of film segments. Since the shield film 150 having a mesh structure, there is a hole in each lattice unit of the sieve or net structure. As a result, the shield film 150 may surround only a portion of the outer surface of the induction coil 120 because of the holes formed across the entire shield film 150.

A proportion of a portion of the outer surface of the induction coil 120 surrounded by the shield film 150 surrounding may be set to a value suitable for blocking EMI from the induction coil 120 by taking a thickness of the shield film 150 into consideration. For example, the shield film 150 may surround only 50% or more and 95% or less of the outer surface of the induction coil 120. Alternatively, the shield film 150 may surround only 75% or more and 90% or less of the outer surface of the induction coil 120. When the thickness of the shield film 150 increases, the proportion of the outer surface of the induction coil 120 surrounded by the shield film 150 may decrease, and when the thickness of the shield film 150 decreases, the proportion of a portion of the outer surface of the induction coil 120 surrounded by the shield film 150 may increase.

As the shield film 150 surrounds only a portion of the outer surface of the induction coil 120 in various ways, exposed portions of the outer surface of the induction coil 120 that are not surrounded by the shield film 150 may be utilized in various ways. For example, a conductor or terminal for supplying electric power to the induction coil 120 from the power supply 130 may be connected to the induction coil 120 through the exposed portions that are not surrounded by the shield film 150. In addition, various sensors, structures, or the like for supporting the shield film 150 may be installed through the exposed portions of the outer surface of the induction coil 120. Thus, ease of a manufacturing process and structural freedom of the aerosol generating device 100 may be increased.

Figure 7:
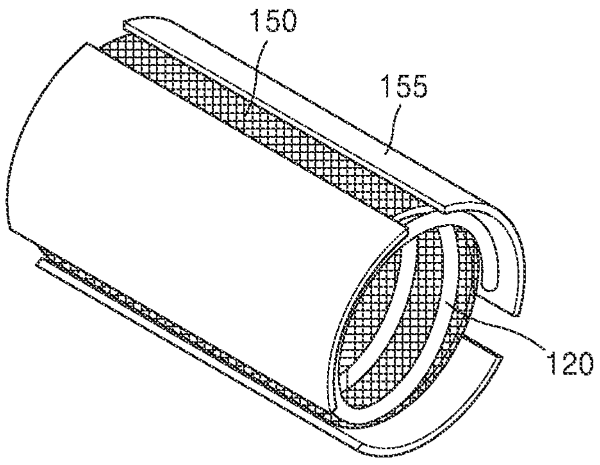
FIG. 7 is a diagram illustrating a structure of a shield film, according to an embodiment of the present disclosure.

FIG. 7 is a diagram illustrating a structure of a shield film, according to an embodiment of the present disclosure.

FIG. 7 illustrates that the aerosol generating device 100 may further include an additional film 155, which may surround at least a portion of an outer surface of the shield film 150. The induction coil 120 is not illustrated in FIG. 7 for the sake of clarity, but the shield film 150 may surround only a portion of the outer surface of the induction coil 120 as described above.

The aerosol generating device 100 may further include the additional film 155 including a nonferrous metal for additionally blocking EMI from electromagnetic waves emitted from the induction coil 120. Unlike the shield film 150 including a ferromagnetic material such as ferrite or the like as described above, the additional film 155 may include a nonferrous metal. Examples of the nonferrous metal included in the additional film 155 may include Cu, lead (Pb), tin (Sn), Zn, Au, platinum (Pt), mercury (Hg), and the like, and an alloy thereof. Unlike the ferromagnetic material such as ferrite or the like, the nonferrous metal may include a paramagnetic material or a diamagnetic material that does not have high magnetic permeability.

The additional film 155 may surround at least a portion of the outer surface of the shield film 150. As illustrated in FIG. 7, the additional film 155 may surround the outer surface of the shield film 150 partially or completely. FIG. 7 illustrates that the shield film 150 has a mesh structure, and the additional film 155 includes three film segments. However, embodiments of the present disclosure are not limited thereto. Combinations of various shapes may be possible, such that the shield film 150 surrounds only a portion of the induction coil 120 and the additional film 155 surrounds at least a portion of the outer surface of the shield film 150.

The additional film 155 may be in contact with at least a portion of the outer surface of the shield film 150 without any gap. For example, the additional film 155 may be stacked on the shield film 150, and the corresponding stacked structure may surround the outer surface of the induction coil 120, thereby implementing a dual film structure of the shield film 150 and the additional film 155. Alternatively, a gap may be formed between the shield film 150 and the additional film 155 depending on needs such as thermal insulation and the like.

The additional film 155 may have the same thickness as the shield film 150. Therefore, the additional film 155 may have a thickness of 0.03 mm or more and 3 mm or less, or 0.06 mm or more and 2 mm or less, or 0.1 mm or more and 0.5 mm or less. However, embodiments of the present disclosure are not limited thereto. A thickness of the entire dual film structure formed with the shield film 150 and the additional film 155 may be 0.03 mm or more and 3 mm or less, or 0.06 mm or more and 2 mm or less, or 0.1 mm or more and 0.5 mm or less.

The additional film 155 may additionally block the EMI with the nonferrous metal included in the additional film 155. For example, when copper, which is a nonferrous metal, is included in the additional film 155, the additional film 155 may have diamagnetic properties. When the additional film 155 is located outside the induction coil 120, by forming magnetism in an opposite direction to a magnetic field emitted from the induction coil 120 according to the diamagnetic properties, the additional film 155 may shield the magnetic field and the electromagnetic waves emitted from the induction coil 120.

When the aerosol generating device 100 further includes the additional film 155 including a nonferrous metal apart from the shield film 150 including a ferromagnetic material, the EMI from the electromagnetic waves emitted from the induction coil 120 may be blocked more efficiently. If the additional film 155 including a nonferrous metal is used alone for electromagnetic shielding, eddy currents may be formed in the additional film 155 while magnetism in a opposite direction to the magnetic field of the induction coil 120 is formed according to the diamagnetic properties of the nonferrous metal, which may result in energy loss. On the other hand, if the shield film 150 including a ferromagnetic material is used alone for electromagnetic shielding, there may be no loss of energy, but the shield performance of the ferromagnetic material may be lower than that of the nonferrous metal. In this light, the dual film structure including the shield film 150 and the additional film 155 may achieve high shield performance without any energy loss due to the eddy current.

On the other hand, unlike the dual film structure in which the ferromagnetic material and the nonferrous metal are separately included in the shield film 150 and the additional film 155, respectively, high shield performance may also be achieved without any energy loss due to the eddy current by a structure in which both the ferromagnetic material and the nonferrous metal are included in the single shield film 150. In the case of such a single film structure, the shield film 150 may further include the nonferrous metal for additionally blocking the EMI from the electromagnetic waves emitted from the induction coil 120. For example, a mixture of the ferromagnetic material and the nonferrous metal may be included in the single shield film 150.

The descriptions of the above-described embodiments are merely examples, and it will be understood by those skilled in the art that various changes and equivalents thereof may be made. Therefore, the scope of the disclosure should be defined by the appended claims, and all differences within the scope equivalent to those described in the claims will be construed as being included in the scope of protection defined by the claims.

What is claimed is:

1. An aerosol generating device comprising:
- an accommodation space having a cylindrical shape and configured to accommodate a cigarette;
- an induction coil wound to conform within and exposed to the accommodation space;
- a power supply configured to supply electric power to the induction coil;
- a controller configured to control electric power supplied to the induction coil; and a shield film including a ferromagnetic material that blocks electromagnetic interference (EMI) from electromagnetic waves emitted from the induction coil, and arranged to surround only a portion of an outer surface of the induction coil to shield the EMI from the electromagnetic waves having a frequency that does not exceed 500 kHz, wherein the remaining portions of the outer surface of the induction coil are also exposed within the accommodation space.

2. The aerosol generating device of claim 1, wherein the shield film comprises a plurality of film segments, and the plurality of film segments surround the portion of the outer surface of the induction coil by partially surrounding the outer surface of the induction coil along a circumferential direction of the outer surface of the induction coil.

3. The aerosol generating device of claim 1, wherein the shield film has a mesh structure that surrounds the portion of the outer surface of the induction coil.

4. The aerosol generating device of claim 1, wherein the shield film surrounds 50% or more and 95% or less of the outer surface of the induction coil.

5. The aerosol generating device of claim 1, further comprising an additional film including a nonferrous metal for additionally blocking the EMI from the electromagnetic waves emitted from the induction coil, wherein the additional film surrounds at least a portion of an outer surface of the shield film.

6. The aerosol generating device of claim 1, wherein the shield film further comprises a nonferrous metal for additionally blocking the EMI from the electromagnetic waves emitted from the induction coil.

7. The aerosol generating device of claim 1, wherein the shield film is spaced apart from the induction coil by 0.5 mm or more and 3 mm or less.

8. The aerosol generating device of claim 1, wherein the shield film has a thickness of 0.2 mm or more and 2 mm or less.

9. The aerosol generating device of claim 1, wherein the controller controls a frequency of an alternating current supplied to the induction coil not to exceed 500 kHz.

* * * * *